Sept. 26, 1950 G. W. ELVERUM 2,523,614
CYCLONE DUST SEPARATOR
Filed May 16, 1945 3 Sheets-Sheet 1

INVENTOR:-
GERARD W. ELVERUM
BY Arthur R. Wylie
ATTY.

Sept. 26, 1950 G. W. ELVERUM 2,523,614
CYCLONE DUST SEPARATOR
Filed May 16, 1945 3 Sheets-Sheet 2

INVENTOR.-
GERARD W. ELVERUM
BY Arthur R. Wylie
ATTY.

Sept. 26, 1950 G. W. ELVERUM 2,523,614
CYCLONE DUST SEPARATOR
Filed May 16, 1945 3 Sheets-Sheet 3
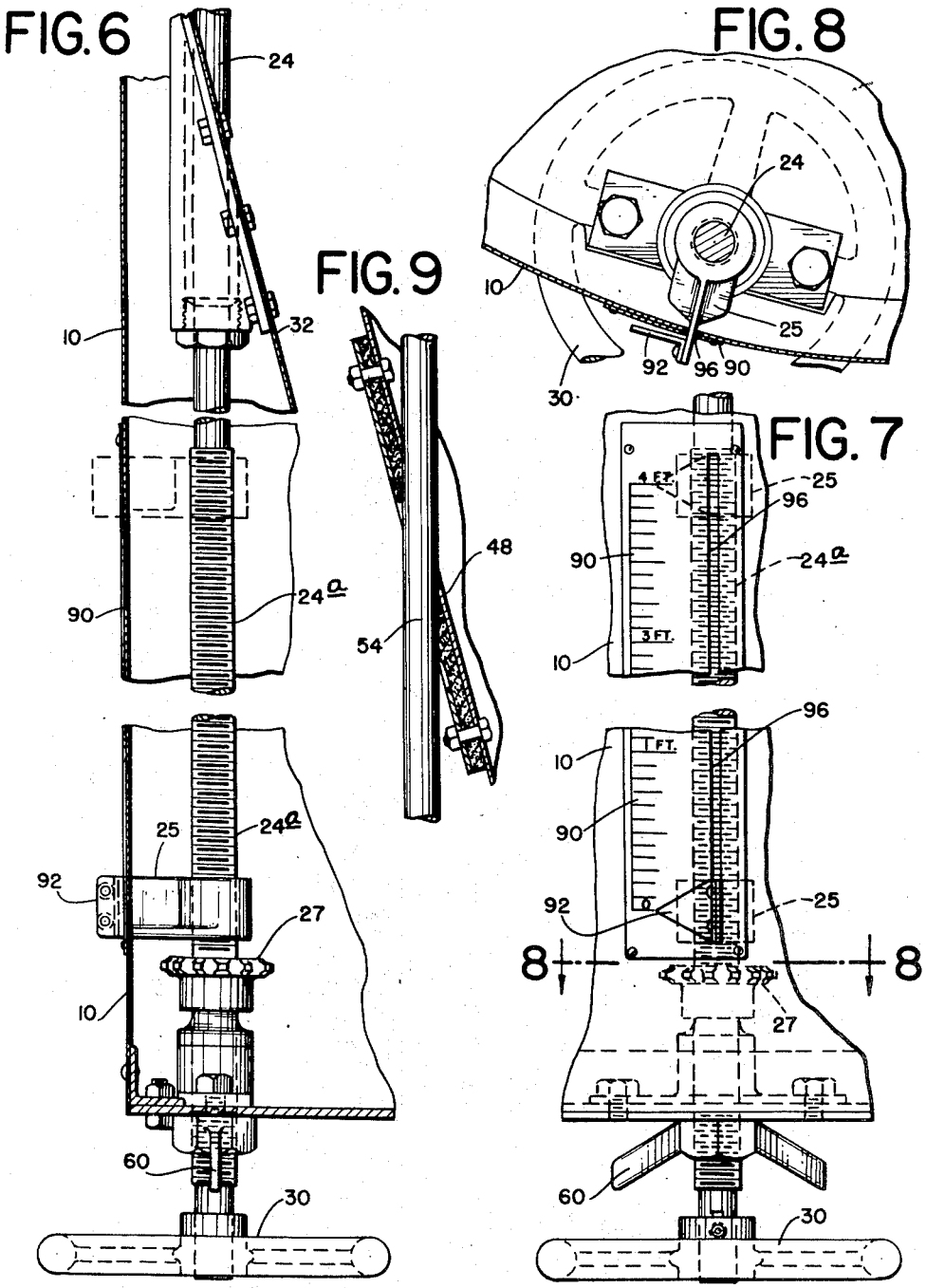
INVENTOR:-
GERARD W. ELVERUM
BY Arthur R. Wylie
ATTY Patented Sept. 26, 1950

2,523,614

UNITED STATES PATENT OFFICE 2,523,614

CYCLONE DUST SEPARATOR

Gerard W. Elverum, Minneapolis, Minn., assignor to General Mills, Inc., a corporation of Delaware Application May 16, 1945, Serial No. 594,072

6 Claims. (Cl. 209—144)

This invention relates to cyclone dust collectors or separators.

An object of this invention is the provision of improved means for collecting dust from air and particularly for separating dust particles of different sizes.

Another object is to provide means for varying or adjusting air pressure at portions of the apparatus to regulate its operation.

These and other objects as will hereinafter appear are accomplished by this invention which is fully described in the following specification and shown in the accompanying drawings in which Figure 1 is a front elevation and partial vertical section showing an embodiment of the invention;

Fig. 2 is a partial enlarged vertical section of one side of the same;

Figs. 3, 4, and 5 are horizontal sections on the lines 3—, 4—, and 5— of Fig. 1;

Fig. 6 is a partial enlarged vertical section on the line 6—6 of Fig. 1;

Fig. 7 is a view of the parts of Fig. 6 viewed at 90° from the position of Fig. 6;

Fig. 8 is a partial horizontal section on the line 8—8 of Fig. 7; and

Fig. 9 is the partial enlarged vertical section through the packing gland for the adjusting rod of Fig. 7.

The embodiment illustrated consists essentially of two concentric cyclonic zones A and B, through which dust and air to be separated are rapidly circulated as will hereinafter be more fully described.

Figure 4:
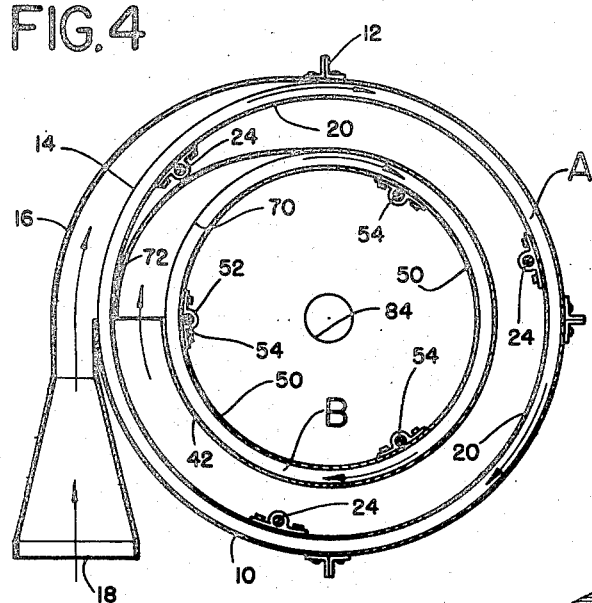
Figure 3:
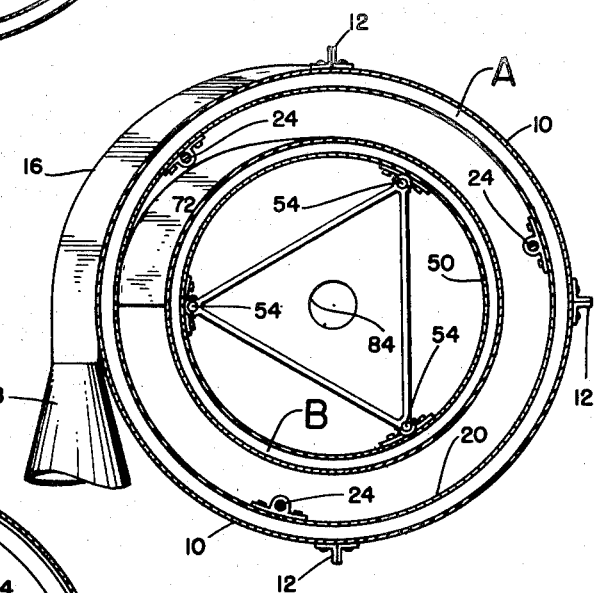

The cyclonic zone A is contained within an outer cylindrical shell 10, which is supported upon suitable legs 12. The upper portion of this shell is provided with an inlet passage or opening 14, (Fig. 4), and around this is located an eccentric inlet 16, which is fed from a suitable pipe 18.

Figure 2:
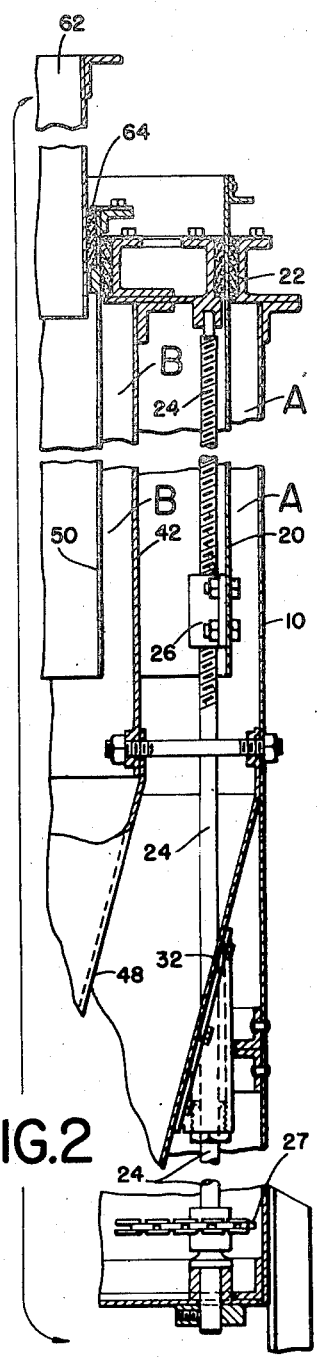
Figure 5:
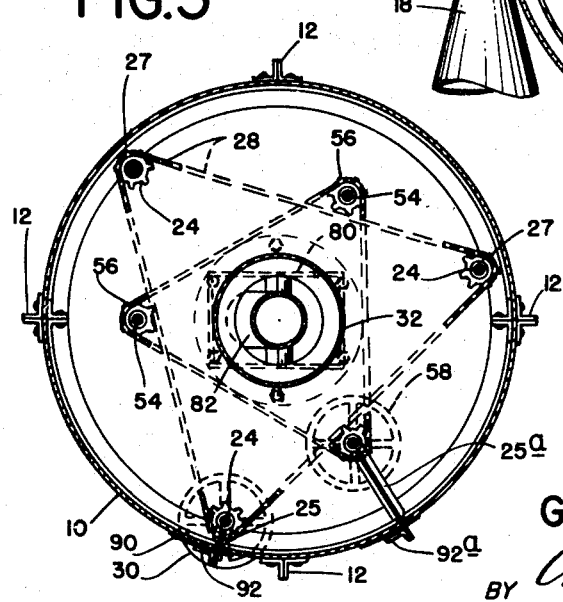

Within the outer shell 10, and forming the inner shell or wall of the cyclonic zone is an adjustable sleeve 20, which extends well down into the outer cylindrical shell. This adjustable sleeve 20 is slidably mounted in a suitable packing gland 22 as shown in Fig. 2, this adjustable sleeve being movable up and down by means of geared adjusting screws 24, acting through nuts 26 secured to the inner wall of the sleeve 20. These screws 24 are mounted for rotation but not for vertical movement. The three screws 24 as shown in Figs. 5 and 6, are geared together by means of similar sprockets 27 around which passes a chain 28. These sprockets are keyed on these screws and one of the screws is provided with a handwheel 30.

The bottom of the outer cyclonic zone A is closed, preferably by means of a conical bottom 32, whose structure and function will later be more fully set forth. This provides a means for raising and lowering the adjusting sleeve 20 at will for a purpose which will later be described.

Figure 1:
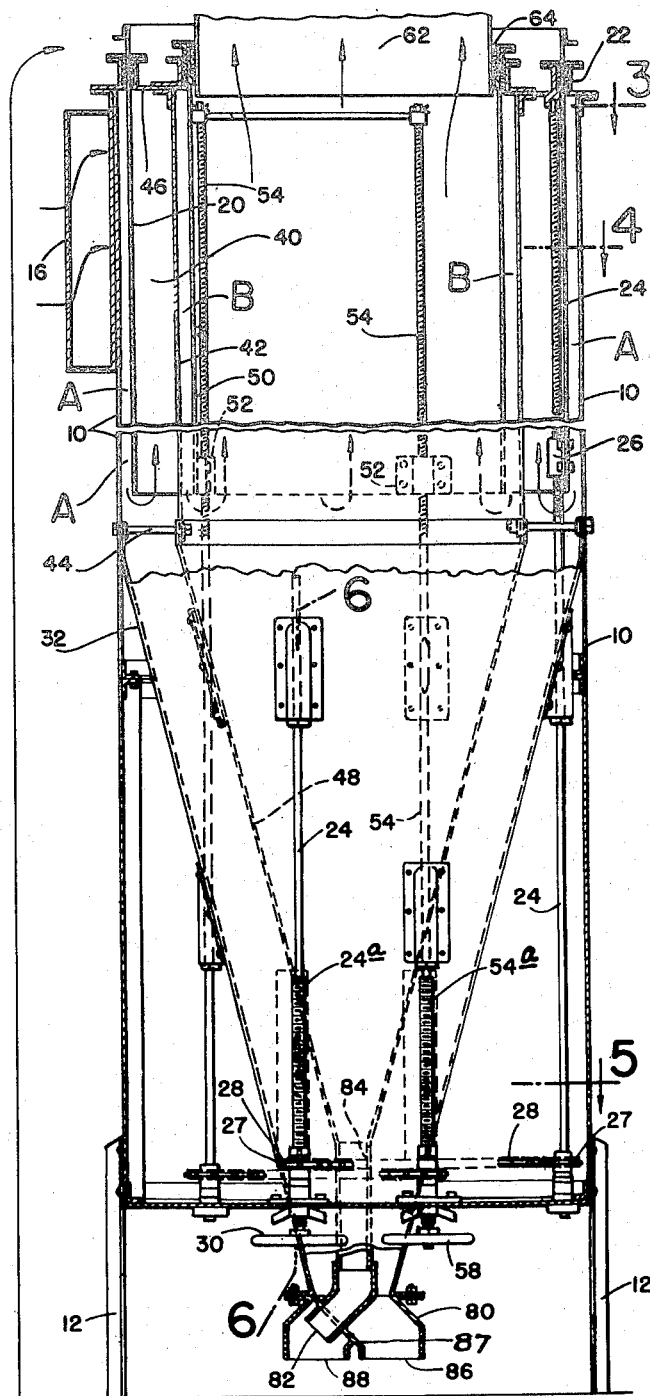

The inner cyclonic zone B is located some distance within the adjustable sleeve 20 but preferably concentric therewith so as to leave a space 40, which is considerably larger than the area of the cyclonic zone A so as to cause air emerging from the bottom of the sleeve 20 to rise relatively slowly through this space 40. The cyclonic zone B is substantially the same size as the cyclonic zone A so that the air entering from the larger space 40 will gain velocity to again have the same speed as that of zone A. A cylindrical shell 42 is suitably secured to the outer shell 10 as by means of bolt 44, the space 40 being closed at the top by means of annular plate 46. The shell 42 has a conical bottom 48 whose relation to the cone 32 will later be pointed out. An adjustable sleeve 50 forms the inner wall of the inner cyclonic zone B, and is provided with nuts 52 on screws 54 which carry sprockets 56 which operate by a handwheel 58 for raising and lowering the adjusting sleeve 50 in the same way as has been previously described for raising and lowering the adjusting sleeve 20. One of the screws 24ª and one of the screws 54ª are threaded at the lower ends and provided with wing-nuts 60 for locking them in any adjusted position. An outlet or discharge pipe 62 is supported from above and has located around it a packing gland 64 as shown in Figs. 1 and 2.

The shell 42 is provided near its top with a rectangular opening 70 and over this is located a spiral plate 72 which serves to deflect the air from the space 40 into the inner cyclonic zone B. The lower end of the conical bottom 32 is provided with bifurcated member 80 which is rotatably mounted on the bottom of the cone 32 and carries a short chute 82 which is rotatably mounted upon an extension 84 of the inner conical bottom 48. Thus, the member 80 has two openings 86 and 88 which communicate respectively with the bottom of the outer cone 32 and of the inner cone 48 and are separated by a partition 87 through which passes the chute 82.

For convenience of operation it is highly desirable that the operator know at all times the exact positions of the adjustable sleeves 20 and 50. For this reason I have provided a fixed scale 90 over which travels an indicator 92 which is carried by a nut 25 on a screw 24ª and which moves up and down at a rate commensurate with the corresponding adjustable sleeve but preferably at a much slower rate, the indicator extending through a vertical slot 96 in the outer cylindrical shell 10. A similar indicator is provided on the screw 54ª to indicate the position of the inner sleeve 50.

The operation of this dust separator is as follows: Air bearing dust to be separated passes into the pipe 18, thence into the outer cyclonic zone A where it is rapidly circulated so as to propel the heavier particles by centrifugal force toward the outer shell. Air with some of the lighter particles will then pass up through the space 40 while the heavier particles will pass down through the conical bottom 32 and thence out through the opening 86.

The air drops additional particles as it slows down and slowly rises upwardly through the wider space 40 the full length of the sleeve 20. The air then passes through the inlet 70 into the narrower cyclonic zone B where it regains its initial velocity of zone A to separate the smaller particles from the air. On emerging from the bottom of this zone into the relatively quiet central space and out through the discharge pipe 62 the lighter dust particles will be deposited in the conical bottom 48 and thence will pass out through the opening 88. Thus a separation is effected of the relatively heavy and relatively light dust particles in the air.

This separation of heavy and light particles is further effected by the relative positions of the adjustable sleeves 20 and 50 as these adjustments affect the air pressure, particularly at the bottoms of sleeves 20 and 50 where the separation of dust and air takes place.

While I have shown this as a double cyclonic dust separator it will be apparent that for many purposes it will be sufficient to omit the inner cyclonic zone B and the conical bottom 48, utilizing only the cyclonic zone A and its conical bottom 32. Adjustments of one or both sleeves may be omitted if desired. Where close adjustments, however, are to be made in the separation of heavier and lighter particles both adjustments and the double cyclonic separator are advisable.

Thus it will be seen that I have provided a very simple and efficient form of dust separator for the purposes indicated.

While I have shown and described but a few forms of the invention it will be seen that it is capable of many modifications. Changes, therefore, in the construction and arrangement may be made which do not depart from the spirit and scope of the invention as defined in the appended claims.

I claim as my invention:

1. A cyclone separator comprising a cylindrical enclosure shell having an inlet passage for tangential entrance of air at high velocity at the upper end and an enclosing means at the lower opening preventing air from escaping downwardly to atmosphere and retaining solids, a second cylindrical shell concentric within the first shell defining a cyclone separating chamber between them, the chamber being narrow to maintain the high velocity of the entering air, the upper end of the second shell beginning at the upper end of the enclosure shell and the lower end short of the enclosure shell to allow the air to pass under the end of the second shell, a third cylindrical shell concentric within the second having the upper end beginning at the upper end of the second shell and defining a low velocity space between them for the air to slowly rise from the bottom of the second to the upper end of the third, said space being wider than said cyclone chamber to reduce the velocity of the air, the third shell being substantially the same length as the enclosure shell and having an inlet passage for entrance of air at the upper end, enclosing means at the bottom opening preventing air from escaping downward to atmosphere, and a fourth cylindrical shell concentric within the third and defining a second cyclone chamber between them which is substantially the same width as said first cyclone chamber, the upper end of the shell even with the upper end of the third shell and the lower end of the shell not extending the full length of the third shell to allow the air to pass thereunder, allowing it to rise slowly in the central space of the fourth shell.

2. A cyclone separator comprising a cylindrical enclosure shell having an inlet passage at the upper end for tangential entrance of air at high velocity and enclosing means at the lower opening preventing air from escaping and retaining solids, a second cylindrical inner shell concentric within the first forming a narrow cyclonic separating chamber therebetween maintaining the air at high velocity, the upper end of the shell beginning at the upper end of the enclosure shell, the lower end short of the enclosure shell to allow the air to pass thereunder, a third cylindrical shell concentric within the second having the upper end even with the second shell and defining a low velocity space between them, the space being wider than said cyclone separating chamber to reduce the velocity of the air, the shell being substantially the same length as the enclosure shell and having a tangential inlet passage at the upper end and means at the bottom end preventing air from escaping and retaining solids, and a fourth cylindrical inner shell concentric within the third defining a second cyclone chamber therebetween which is substantially the same width as the first cyclone chamber to bring the velocity of air up to the velocity of the first, the fourth shell beginning at the top of the third and stopping short of the bottom end to allow the air to pass under, and adjustment means for adjusting the lower edge of the inner cyclone shell adjusting said edge in the direction of its axis.

3. A cyclone separator comprising a cylindrical enclosure shell having a tangential inlet passage at the upper end admitting air at high velocity and an enclosing means at the lower opening preventing air from escaping and retaining solids, a second cylindrical shell adjustable along its axis and concentric within the first defining a cyclonic separating chamber therebetween, the upper end of the shell extending to the end of the first shell, the chamber being narrow to maintain the high velocity of air and the lower end extending short of the first shell to allow air to pass thereunder, a third cylindrical shell concentric within the second having the upper end even with the second shell and defining a space therebetween which is wider than the cyclone chamber to reduce the velocity of the rising air, said third shell extending substantially the same length as the first shell and having a tangential inlet at the upper end and an enclosing means at the lower opening preventing air from escaping and retaining solids, and a fourth shell located within the third, said fourth shell extending concentrically from the upper end of the third and stopping short of the lower end to allow the air to pass thereunder, said fourth shell being adjustable along its axis.

4. A cyclone separator comprising a cylindrical enclosure shell having a tangential inlet passage at the upper end and a conical member enclosing the lower opening preventing air from escaping and retaining solids, a second cylindrical shell extending concentrically from the top of a first shell and located therein, said second shell stopping short of the bottom of the first shell to allow the air to pass thereunder, said second shell having adjustment means moving it along its axis, a third shell located within the second and extending substantially the length of the first, the ends being even therewith and having a conical enclosure at the bottom opening and a tangential inlet at the top, and a fourth shell located within the third and extending concentrically from the top of the third, said fourth shell stopping short of the bottom to allow air to pass thereunder, said fourth shell having adjustment means moving it along its axis, the spaces between the first and second and third and fourth shells being substantially the same and smaller than the space between the second and third shells.

5. A cyclone separator comprising an outer cylindrical shell having a tangential inlet at the top and a conical enclosure at the bottom for collecting solids, a second shell extending from the top of the first and located therein, said second shell stopping short of the bottom of the first and allowing air to pass thereunder, an adjustment screw rotatably journaled in the outer shell and threaded to the inner shell for adjusting the inner shell along its axis, a third concentric shell located within the fourth and extending substantially the length of the first, the ends being even therewith and having a tangential opening at the upper end and a conical enclosure at the lower end for collecting solids, a fourth shell located within the third, said fourth shell concentrically extending from the top of the third and stopping short of the bottom to allow air to pass thereunder, and an adjustment screw rotatably journaled in the third shell and threaded to the fourth adjusting it along its axis, the spaces between the first and second and third and fourth shells being substantially equal and less than the space between the second and third shells.

6. A cyclone separator comprising a cylindrical enclosure shell having an inlet passage for entrance of air at high velocity at the upper end and an enclosing means at the lower end preventing air from escaping downwardly to atmosphere and retaining solids, a second cylindrical shell located within the first and concentric therewith defining a cyclone separating chamber therebetween, the chamber being narrow to maintain the high velocity of the air and the lower end of the second shell short of the enclosing means to allow the air to pass under the end of the second shell, a third cylindrical shell having an inlet passage for entrance of air, said third shell located within the second shell and concentric therewith defining a low velocity space therebetween wider than said first cyclone zone for the air to slowly move from the bottom of the second to the inlet passage of the third shell, enclosing means at the bottom opening of the third shell preventing air from escaping downward to atmosphere and retaining solids, and a fourth cylindrical shell located within the third and concentric therewith defining a second cyclone chamber therebetween narrower than said low velocity space to increase velocity of the air, the lower end of the fourth shell short of the enclosing means to allow the air to pass thereunder to rise slowly in the central space of the fourth shell.

GERARD W. ELVERUM.

REFERENCES CITED

The following references are of record in the file of this patent:

UNITED STATES PATENTS

| Number | Name | Date |
|---|---|---|
| 819,171 | Robinson | May 1, 1906 |
| 1,978,802 | Lissman | Oct. 30, 1934 |
| 2,128,166 | Schmidt | Aug. 23, 1938 |
| 2,153,270 | Osgood | Apr. 4, 1939 |
| 2,372,514 | Pootjes | Mar. 27, 1946 |

FOREIGN PATENTS

| Number | Country | Date |
|---|---|---|
| 117,328 | Australia | July 29, 1943 |